United States Patent
Han et al.

(10) Patent No.: US 11,340,344 B2
(45) Date of Patent: May 24, 2022

(54) APPARATUS AND METHOD FOR TRACKING TARGET VEHICLE AND VEHICLE INCLUDING THE SAME

(71) Applicants: Hyundai Motor Company, Seoul (KR); Kia Motors Corporation, Seoul (KR)

(72) Inventors: Seul Ki Han, Seoul (KR); Hoon Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 207 days.

(21) Appl. No.: 16/535,974

(22) Filed: Aug. 8, 2019

(65) Prior Publication Data
US 2020/0191942 A1    Jun. 18, 2020

(30) Foreign Application Priority Data
Dec. 18, 2018    (KR) .......................... 10-2018-0164522

(51) Int. Cl.
*G01S 13/72* (2006.01)
*G01S 13/931* (2020.01)
*G01S 13/00* (2006.01)

(52) U.S. Cl.
CPC .......... *G01S 13/723* (2013.01); *G01S 13/931* (2013.01)

(58) Field of Classification Search
CPC ............................................. B60W 2050/0022
See application file for complete search history.

(56) References Cited

U.S. PATENT DOCUMENTS

| | | | | |
|---|---|---|---|---|
| 5,138,321 A * | 8/1992 | Hammer | ............... | G01S 13/726 342/36 |
| 5,317,319 A * | 5/1994 | Fagarasan | ............. | G01S 13/726 342/195 |
| 5,414,643 A * | 5/1995 | Blackman | ............. | G01S 13/726 342/95 |
| 8,482,486 B2 * | 7/2013 | Seder | ..................... | G01S 13/867 345/7 |
| 9,594,160 B2 * | 3/2017 | Garrett et al. | ........ | G01S 13/726 |
| 10,466,361 B2 * | 11/2019 | Lee | ......................... | G01S 13/726 |
| 10,551,838 B2 * | 2/2020 | Liu | ........................ | G01S 13/867 |
| 10,602,242 B2 * | 3/2020 | Zeng | ...................... | G01S 13/931 |

(Continued)

FOREIGN PATENT DOCUMENTS

FR    3054672 A1 *    2/2018    .......... G01S 13/931

OTHER PUBLICATIONS

R. Mobus et al., "Multi-Target Multi-Object Tracking, Sensor Fusion of Radar and Infrared"; proceedings of the 2004 IEEE Intelligent Vehicles Symposium; pp. 732-737; published by IEEE, Piscataway, NJ, USA; published on IEEE Xplore on Oct. 8, 2004. (Year: 2004).*

*Primary Examiner* — Bernarr E Gregory
(74) *Attorney, Agent, or Firm* — Mintz Levin Cohn Ferris Glovsky and Popeo, P.C.; Peter F. Corless

(57) ABSTRACT

The present invention discloses apparatus for tracking a target vehicle which tracks the target vehicle by identifying a plurality of sensor tracks output from a plurality of different kinds of sensors. The apparatus for tracking a target vehicle incudes a sensor track processing unit, a sensor track association determination unit, a sensor fusion track tracking unit, and a sensor fusion track management unit.

20 Claims, 3 Drawing Sheets

(56) References Cited

U.S. PATENT DOCUMENTS

| | | | |
|---|---|---|---|
| 2003/0060945 A1* | 3/2003 | Varon | G01S 13/91 |
| | | | 701/4 |
| 2003/0179084 A1* | 9/2003 | Skrbina | G01S 13/867 |
| | | | 340/435 |
| 2004/0178945 A1* | 9/2004 | Buchanan | G01S 13/867 |
| | | | 342/70 |
| 2010/0191391 A1* | 7/2010 | Zeng | G01S 13/867 |
| | | | 701/1 |
| 2012/0140061 A1* | 6/2012 | Zeng | G01S 13/867 |
| | | | 348/135 |
| 2017/0242117 A1* | 8/2017 | Izzat | G01S 13/931 |
| 2018/0067490 A1* | 3/2018 | Pollach | G05D 1/0088 |
| 2019/0204411 A1* | 7/2019 | Hsieh | G01S 13/726 |

\* cited by examiner

APPARATUS AND METHOD FOR TRACKING TARGET VEHICLE AND VEHICLE INCLUDING THE SAME

CROSS-REFERENCE TO RELATED APPLICATION

This application claims the benefit of priority to Korean Patent Application No. 10-2018-0164522, filed on Dec. 18, 2018 in the Korean Intellectual Property Office, the contents of which are hereby incorporated by reference as if fully set forth herein.

BACKGROUND OF THE DISCLOSURE

Technical Field

The present disclosure relates to an apparatus for tracking a target vehicle, and more particularly, to an apparatus for tracking a target vehicle by identifying a plurality of sensor tracks output from a plurality of different kinds of sensors, a method for tracking a target vehicle using the apparatus, and a vehicle including the same.

Discussion of the Related Art

Recently, vehicles have incorporated information and communication technologies for the purpose of improving driver safety. Vehicle collision prevention systems, for example, may prevent major accidents by sensing an obstacle located ahead of the vehicle while driving at high speeds. These systems include a range of system varieties such as an adaptive cruise control system, a forward vehicle collision warning system, a lane departure warning system, and so on.

Some vehicle collision prevention systems are capable of assessing an omnidirectional area around the vehicle beyond a recognition range of a single sensor. To this end, a plurality of sensors installed in the vehicle may acquire pieces of recognition information characterizing surrounding environments and objects, and the pieces of information may be associated to characterize a particular target to be tracked.

In order to correctly recognize surrounding environments using a plurality of different kinds of sensors in a vehicle, relationships among the pieces of information acquired from detection areas of the respective sensors may be analyzed. However, problems can be caused by differences in performances and recognition reference points due to different kinds of sensor tracks. If multiple sensor tracks exist, it is difficult to correctly determine whether the sensor tracks come from the same object. Similarly, it can be difficult to express the sensor tracks as a single recognition reference point.

Such a problem occurs frequently during handover of the same object via various sensor detection areas, e.g., a process of moving from a detection area of an existing sensor to a detection area of another sensor. Pieces of information generated from a plurality of different sensor detection areas should be correctly recognized as being caused by the same object. Therefore, development of an apparatus for precisely tracking a target vehicle by accurately determining whether or not a plurality of sensor tracks comes from the same object is required.

SUMMARY OF THE DISCLOSURE

Accordingly, the present disclosure is directed to an apparatus and method for tracking a target vehicle and a vehicle including the same that substantially obviate one or more problems due to limitations and disadvantages of the related art.

Objects of the present disclosure include providing an apparatus for tracking a target vehicle which may determine whether or not an association between a plurality of sensor tracks exists, to determine whether or not tracking reference points of the sensor tracks are the same, and also to generate a "sensor fusion track" to accurately determine whether or not the sensor tracks come from the same object. As a result, it can be possible to precisely track target vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with embodiments of the disclosure, an apparatus for tracking a target vehicle may include: a control unit equipped in a vehicle, the control unit including a memory configured to store program instructions and at least one processor configured to execute the stored program instructions, wherein, upon executing the stored program instructions, the at least one processor is configured to operate as: a sensor track processing unit which receives sensor recognition information from different kinds of sensors operatively coupled to the vehicle and generates sensor tracks based on the sensor recognition information; a sensor track association determination unit which determines whether an association between the individual sensor tracks exists, determines whether tracking reference points of the sensor tracks are the same when the association between the individual sensor tracks exists, generates a sensor fusion track by fusing the sensor tracks when the tracking reference points of the sensor tracks are the same, and outputs the sensor fusion track; a sensor fusion track tracking unit which tracks the outputted sensor fusion track; and a sensor fusion track management unit which manages the tracked sensor fusion track.

Furthermore, in accordance with embodiments of the present disclosure, a method for tracking a target vehicle may include: receiving, at a control unit equipped in a vehicle, sensor recognition information from different kinds of sensors operatively coupled to the vehicle; generating, by the control unit, sensor tracks based on the received sensor recognition information; determining, by the control unit, whether an association between the individual sensor tracks exists; determining, by the control unit, whether tracking reference points of the sensor tracks are the same when the association between the individual sensor tracks exists; generating, by the control unit, a sensor fusion track by fusing the sensor tracks when the tracking reference points of the sensor tracks are the same; outputting, by the control unit, the sensor fusion track; tracking, by the control unit, the outputted sensor fusion track; and managing, by the control unit, the tracked sensor fusion track.

Furthermore, in accordance with embodiments of the present disclosure, a non-transitory computer-readable recording medium having a program recorded therein may be provided to implement the above-described method using the above-described apparatus.

Furthermore, in accordance with embodiments of the present disclosure, a vehicle may include an apparatus for tracking a target vehicle. The apparatus may include a control unit including a memory configured to store program instructions and at least one processor configured to execute the stored program instructions. Upon executing the stored program instructions, the at least one processor may be configured to operate as: a sensor track processing unit which receives sensor recognition information from different kinds of sensors operatively coupled to the vehicle and generates sensor tracks based on the sensor recognition information; a sensor track association determination unit which determines whether an association between the individual sensor tracks exists, determines whether tracking reference points of the sensor tracks are the same when the association between the individual sensor tracks exists, generates a sensor fusion track by fusing the sensor tracks when the tracking reference points of the sensor tracks are the same, and outputs the sensor fusion track; a sensor fusion track tracking unit which tracks the outputted sensor fusion track; and a sensor fusion track management unit which manages the tracked sensor fusion track.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

Figure 1:
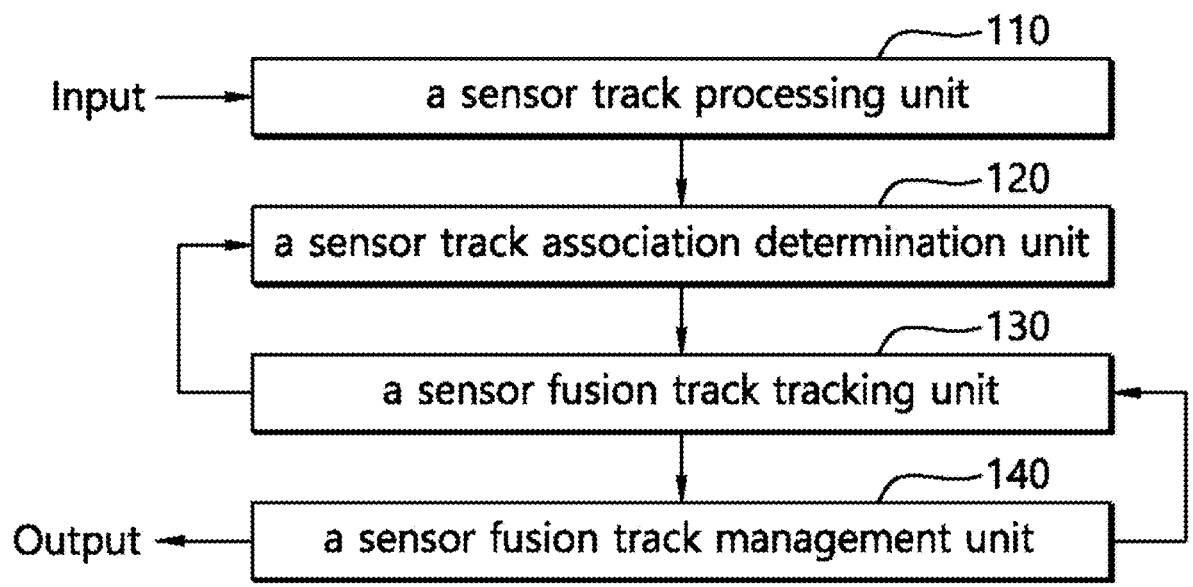
FIG. 1 is a block diagram illustrating an apparatus for tracking a target vehicle in accordance with embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE DISCLOSURE

Reference will now be made in detail to the exemplary embodiments of the present disclosure, examples of which are illustrated in the accompanying drawings. However, the present disclosure may be embodied in many alternative forms and should not be construed as limited to the embodiments set forth herein. In the drawings, parts unrelated to the present disclosure are omitted to clearly describe the present disclosure, and, in the following description of the embodiments and the drawings, the same or similar elements are denoted by the same reference numerals even though they are depicted in different drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, in the following description of the embodiments, the terms "including", "comprising", "having", etc. will be interpreted as indicating the presence of one or more other characteristics, numbers, steps, operations, elements or parts stated in the specification or combinations thereof, and do not exclude presence of other characteristics, numbers, steps, operations, elements, parts or combinations thereof, or possibility of adding the same, unless stated otherwise. Further, in the following description of the embodiments, it will be understood that the terms "part", "unit" and "module" mean units to process at least one function or operation, and the unit may be implemented by hardware, software or combination of hardware and software.

It is also understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. The control unit may control operation of units, modules, parts, devices, or the like, as described herein. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, referring to FIGS. 1 to 5, an apparatus and method for tracking a target vehicle and a vehicle including the same which may be applied to the embodiments of the present disclosure will be described in detail.

FIG. 1 is a block diagram illustrating an apparatus for tracking a target vehicle in accordance with embodiments of the present disclosure.

As exemplarily shown in FIG. 1, the apparatus in accordance with the present disclosure may include a sensor track processing unit 110, a sensor track association determination unit 120, a sensor fusion track tracking unit 130 and a sensor fusion track management unit 140. Operation of each of these units may be controlled by a control unit as defined hereinabove. Therefore, upon executing program instructions stored by a memory of the control unit, the at least one processor of the control unit may be configured to perform the respective functionalities of the sensor track processing unit 110, sensor track association determination unit 120, sensor fusion track tracking unit 130, and sensor fusion track management unit 140, as described in detail hereinbelow.

The sensor track processing unit 110 may receive sensor recognition information from a plurality of different kinds of sensors and generate sensor tracks.

For example, the sensor track processing unit 110 may receive sensor recognition information from a plurality of different kinds of sensors including a left-side radar, a right-side radar and a front radar.

Further, the sensor track association determination unit 120 may, if the generated sensor tracks are present in plural, determine whether or not an association between the sensor tracks exists, determine whether or not tracking reference points of the sensor tracks are the same upon determining that the association between the sensor tracks exists, and output a sensor fusion track acquired by fusing the sensor tracks upon determining that the tracking reference points are the same.

Here, the sensor track association determination unit 120 may set tracking reference points of the sensor tracks with the same value as equal to each other such that these tracking reference points coincide with each other prior to determining whether or not the association between the sensor tracks exists.

For example, the tracking reference points may be set to a rear bumper central value of the target vehicle.

Further, the tracking reference point may be calculated by Equations $x = x^{cr} + l/2 \cdot \sin(\theta)$, $y = y^{cr} + l/2 \cdot \cos(\theta)$ (x being a longitudinal position of the tracking reference point, y being a lateral position of the tracking reference point, $x^{cr}$ being a longitudinal position of a side radar, $y^{cr}$ being a lateral position of the side radar and l being a length of the target vehicle).

Further, the sensor track association determination unit 120 may perform single tracking of the target vehicle using the Kalman filter when the sensor tracks are located in a single sensing area of one sensor, prior to determination as to whether or not the association between the sensor tracks exists.

The sensor track association determination unit 120 may estimate width and length information of the target vehicle, when the sensor track association determination unit 120 performs single tracking of the target vehicle.

Further, the sensor track association determination unit 120 may confirm coincidence between class information of the sensor track and the width and length information corresponding thereto, when the sensor track association determination unit 120 estimates the width and length information of the target vehicle.

Further, when the sensor track association determination unit 120 determines whether or not the association between the sensor tracks exists, the sensor track association determination unit 120 may determine whether or not the association between the sensor tracks exists, based on a condition expressed by Equations $\{x^r: (x^{cr}-x^r)^2 \leq \sigma_x^2\}$, $\{y^r: (y^{cr}-y^r)^2 \leq \sigma_y^2\}$ ($x^r$ being a longitudinal position of a front radar, $y^r$ being a lateral position of the front radar, $x^{cr}$ being the longitudinal position of the side radar, $y^{cr}$ being the lateral position of the side radar, $\sigma_x$ being a longitudinal position error standard deviation of the sensor track and $\sigma_y$ being a lateral position error standard deviation of the sensor track), and design variables expressed by Equations $\sigma_x \approx w$, $\sigma_y \approx l$ ($\sigma_x$ being the longitudinal position error standard deviation of the sensor track, $\sigma_y$ being the lateral position error standard deviation of the sensor track, w being a width of the target vehicle and l being a length of the target vehicle).

Further, when the sensor track association determination unit 120 determines whether or not the association between the sensor tracks exists, the sensor track association determination unit 120 may determine whether or not the association between the sensor tracks exists, based on an Equation $$f(x^{cr}, x^r, \sigma_x) = \frac{1}{\sqrt{2\pi\sigma_x^2}} \exp\left\{-\frac{(x^{cr}-x^r)^2}{2\sigma_x^2}\right\}$$

($x^{cr}$ being the longitudinal position of the side radar, $x^r$ being the longitudinal position of the front radar and $\sigma_x$ being the longitudinal position error standard deviation of the sensor track), so that the sensor tracks mutually satisfy a normal distribution.

Also, when the sensor track association determination unit 120 determines whether or not the tracking reference points of the sensor tracks are the same, the sensor track association determination unit 120 may determine whether or not the tracking reference points of the sensor tracks are the same, based on a first condition expressed by an Equation $(x^{cr} \pm w/2, y^{cr} + l) \in \mathcal{S}$ ($x^{cr}$ being the longitudinal position of the side radar, $y^{cr}$ being the lateral position of the side radar, w being the width of the target vehicle, l being the length of the target vehicle and $\mathcal{S}$ being a sensing area of the front radar), and a second condition expressed by Equations $\{x^r: (x^{cr}-x^r)^2 \leq (\sigma_x/2)^2\}$, $\{y_r: (y^{cr}-y^r)^2 \leq (\sigma_y/5)^2\}$ ($x^r$ being the longitudinal position of the front radar, $y^r$ being the lateral position of the front radar, $x^{cr}$ being the longitudinal position of the side radar, $y^{cr}$ being the lateral position of the side radar, $\sigma_x$ being the longitudinal position error standard deviation of the sensor track and $\sigma_y$ being the lateral position error standard deviation of the sensor track).

The first condition is a condition to determine whether or not the entirety or a part of the target vehicle is included in the sensing area of the front radar, and the second condition is a condition to determine whether or not a front radar track and a side radar track are generated by the same tracking reference point.

Further, when the sensor track association determination unit 120 outputs the sensor fusion track acquired by fusing the sensor tracks, the sensor track association determination unit 120 may calculate sensor fusion track information using Equations $x = w_x^r \cdot x^r + w_x^{cr} \cdot x^{cr}$, $y = w_y^r \cdot y^r + w_y^{cr} \cdot y^{cr}$ ($w_x^r$ and $w_y^r$ being fusion weights to front radar track information, $w_x^{cr}$ and $w_y^{cr}$ being fusion weights to side radar track information, x being a longitudinal position of the sensor fusion track, y being a lateral position of the sensor fusion track, $x^{cr}$ being the longitudinal position of the side radar and $y^{cr}$ being the lateral position of the side radar).

When the sensor track association determination unit 120 outputs the sensor fusion track acquired by fusing the sensor tracks, the sensor track association determination unit 120 may set the fusion weights to the front radar track information so as to trust the front radar track with respect to the longitudinal position of the sensor track, and set the fusion weights to the side radar track information so as to trust the side radar track with respect to the lateral position of the sensor track.

Further, when the sensor track association determination unit 120 outputs the sensor fusion track acquired by fusing the sensor tracks, the sensor track association determination unit 120 may calculate sensor fusion track information using Equations $w_x^r=|x^r-\hat{x}|$, $w_y^r=|y^r-\hat{y}|$, $w_x^{cr}=|x^{cr}-\hat{x}|$, $w_y^{cr}=|y^{cr}-\hat{y}|$ ($w_x^r$ and $w_y^r$ being the fusion weights to the front radar track information, $w_x^{cr}$ and $w_y^{cr}$ being the fusion weights to the side radar track information, x being the longitudinal position of the sensor fusion track, y being the lateral position of the sensor fusion track, $x^{cr}$ being the longitudinal position of the side radar, $y^{cr}$ being the lateral position of the side radar and $\hat{x}$ and $\hat{y}$ being estimated values).

Thereafter, upon determining that the association between the sensor tracks does not exist, the sensor track association determination unit 120 may regard the sensor tracks as being generated from different objects and perform individual tracking of the respective sensor tracks using the Kalman filter.

Next, the sensor fusion track tracking unit 130 may track the output sensor fusion track.

Then, the sensor fusion track management unit 140 may manage the tracked sensor fusion track.

As such, the present disclosure may determine whether or not an association between a plurality of sensor tracks exists, determine whether or not tracking reference points of the sensor tracks are the same and generate a sensor fusion track based on results of determination, thereby accurately determining whether or not the sensor tracks come from the same object and precisely tracking the target vehicle.

Further, the present disclosure may solve handover caused by use of a plurality of different kinds of sensors to realize an autonomous vehicle.

In addition, the present disclosure may calculate position information of a vehicle driving straight in the longitudinal direction in a lane next to a host vehicle so as to coincide with actual vehicle behavior.

Further, the present disclosure proposes a method for properly fusing position information of the respective sensor tracks beyond determination as to whether or not the sensor tracks correspond to the same object, and may thus facilitate precise control required to realize an autonomous vehicle.

Therefore, embodiments of the present disclosure may be applied to a target vehicle tracking technique using a plurality of different kinds of sensors.

Figure 2:
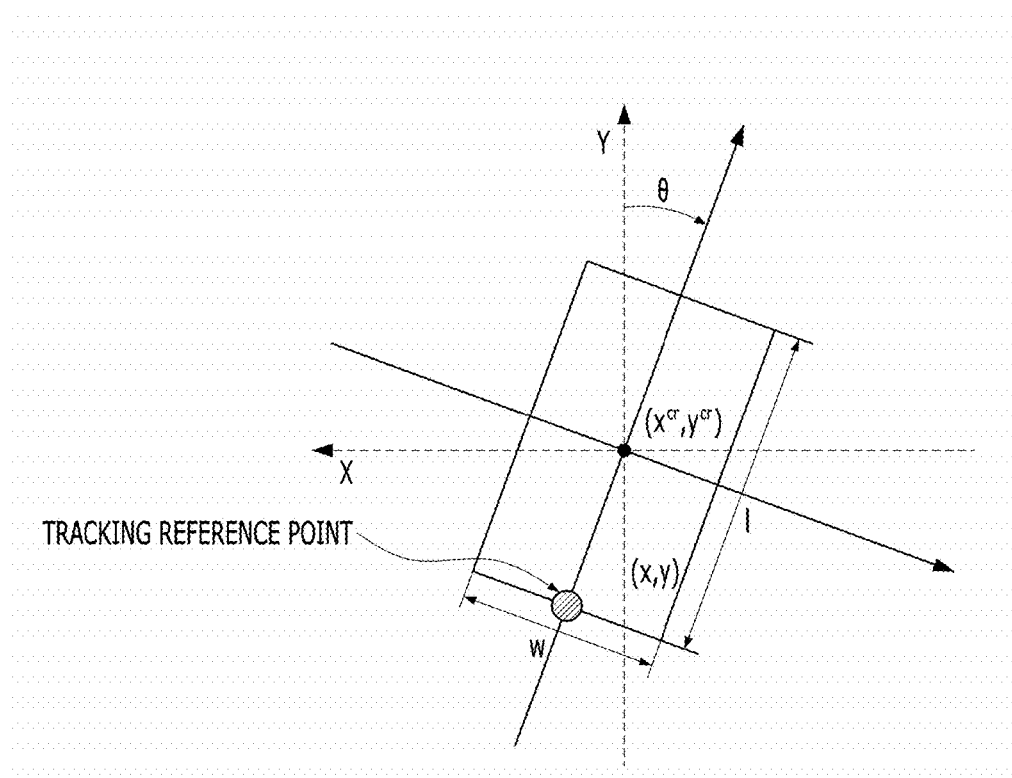
FIG. 2 is a view illustrating a process for calculating a tracking reference point of a plurality of sensor tracks.

FIG. 2 is a view illustrating a process for calculating a tracking reference point of a plurality of sensor tracks.

As exemplarily shown in FIG. 2, if a target vehicle is tracked using a plurality of different kinds of sensors, tracking reference points of the respective sensors may be different, and thus it is necessary to define one tracking reference point of a vehicle to be tracked.

For example, the tracking reference point of the target vehicle may be defined as a rear bumper central value of the target vehicle.

Here, a side radar track based on the center of the target vehicle may be expressed by Equations below.

$$x=x^{cr}+l/2\cdot\sin(\theta)$$

$$y=y^{cr}+l/2\cdot\cos(\theta)$$

Here, x is a longitudinal position of the tracking reference point, y is a lateral position of the tracking reference point, $x^{cr}$ is a longitudinal position of a side radar, $y^{cr}$ is a lateral position of the side radar and l is a length of the target vehicle.

Further, if the target vehicle exists in a single sensing area of the front or side radar, tracking of the target vehicle may be performed using the general Kalman filter.

While single tracking of the target vehicle by the side radar is performed, width and length information of the target vehicle may be estimated.

For example, in order to more stably use the width and length information supplied from the side radar track, coincidence between class information of the track and the width and length information may be confirmed.

If the class information of the track represents a sedan and the length of the target vehicle is estimated as 10 cm or more, the information may be determined as invalid information.

As such, prior to determining whether the association between the sensor tracks exists, tracking reference points of the sensor tracks with the same value may be set as equal to each other such that these tracking reference points coincide with each other.

Further, the tracking reference point may be calculated by Equations $x=x^{cr}+l/2\cdot\sin(\theta)$, $y=y^{cr}+l/2\cdot\cos(\theta)$ (x being the longitudinal position of the tracking reference point, y being the lateral position of the tracking reference point, $x^{cr}$ being the longitudinal position of the side radar, $y^{cr}$ being the lateral position of the side radar and l being the length of the target vehicle).

Further, prior to determination as to whether or not the association between the sensor tracks exists, single tracking of the target vehicle using the Kalman filter may be performed when the sensor tracks are located in a single sensing area of one sensor.

When single tracking of the target vehicle is performed, width and length information of the target vehicle may be estimated.

Further, when the width and length information of the target vehicle is estimated, coincidence between class information of the sensor track and the width and length information corresponding thereto may be confirmed.

Figure 3:
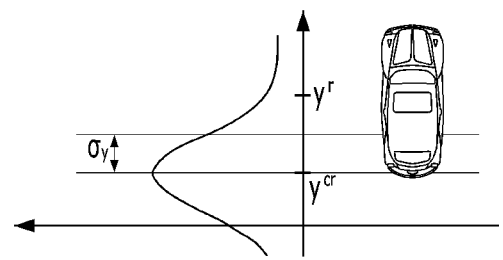
FIG. 3 is a view illustrating a process of determining an association between the sensor tracks.

FIG. 3 is a view illustrating a process of determining an association between the sensor tracks.

As exemplarily shown in FIG. 3, in the present disclosure, whether or not front and side radar tracks are generated from the same vehicle may be determined.

That is, the front radar track satisfying a condition below and design variables below may be regarded as being generated from the same vehicle as the side radar track.

Condition: $\{x^r:(x^{cr}-x^r)^2\leq\sigma_x^2\}$ $\{y^r:(y^{cr}-y^r)^2\leq\sigma_y^2\}$ Here, $x^r$ is a longitudinal position of the front radar, $y^r$ is a lateral position of the front radar, $x^{cr}$ is a longitudinal position of the side radar, $y^{cr}$ is a lateral position of the side radar, $\sigma_x$ is a longitudinal position error standard deviation of the sensor track and $\sigma_y$ is a lateral position error standard deviation of the sensor track).

Design variables: $\sigma_x \approx w, \sigma_y \approx l$

Here, $\sigma_x$ is the longitudinal position error standard deviation of the sensor track, $\sigma_y$ is the lateral position error standard deviation of the sensor track, w is a width of the target vehicle and l is a length of the target vehicle.

That is, determination as to association/non-association between the sensor tracks may be performed based on the width and length information supplied from the side radar.

This is based upon the premise that the sensor tracks coming from the same object mutually satisfy a normal distribution, and an Equation below should be satisfied.

$$f(x^{cr}, x^r, \sigma_x) = \frac{1}{\sqrt{2\pi\sigma_x^2}} \exp\left\{-\frac{(x^{cr} - x^r)^2}{2\sigma_x^2}\right\}$$

Here, $x^{cr}$ is the longitudinal position of the side radar, $x^r$ is the longitudinal position of the front radar and $\sigma_x$ is the longitudinal position error standard deviation of the sensor track.

Further, as exemplarily shown in FIG. 3, if the side radar track is generated with respect to the reference point, whether or not the front and side radar tracks are generated from the same object may be determined by determining whether or not the front radar track is sufficiently close to the side radar track.

Thereafter, upon determining that the front and side radar tracks are generated from the same vehicle, whether or not the front radar track is generated with respect to the tracking reference point of the target vehicle may be determined.

First condition: $(x^{cr} \pm w/2, y^{cr} + l) \in \mathcal{S}$

Here, $x^{cr}$ is the longitudinal position of the side radar, $y^{cr}$ is the lateral position of the side radar, w is the width of the target vehicle, l is the length of the target vehicle and $\mathcal{S}$ is a sensing area of the front radar.

Second condition: $\{x^r : (x^{cr} - x^r)^2 \leq (\sigma_x/2)^2\}$ $\{y^r : \{y^{cr} - y^r\}^2 \leq (\sigma_y/5)^2\}$ Here, $x^r$ is the longitudinal position of the front radar, $y^r$ is the lateral position of the front radar, $x^{cr}$ is the longitudinal position of the side radar, $y^{cr}$ is the lateral position of the side radar, $\sigma_x$ is the longitudinal position error standard deviation of the sensor track and $\sigma_y$ is the lateral position error standard deviation of the sensor track.

The first condition is a condition to determine whether or not the entirety or a part of the target vehicle is included in the sensing area of the front radar, and the second condition is a condition to determine whether or not the front radar track and the side radar track are generated by the same tracking reference point.

Thereafter, upon determining that the front and side radar tracks are generated by the same tracking reference point, final track information may be calculated by fusing the information by Equations below.

$x = w_x^r \cdot x^r + w_x^{cr} \cdot x^{cr}$ $y = w_y^r \cdot y^r + w_y^{cr} \cdot y^{cr}$ Here, $w_x^r$ and $w_y^r$ are fusion weights to front radar track information, $w_x^{cr}$ and $w_y^{cr}$ are fusion weights to side radar track information, x is a longitudinal position of a sensor fusion track, y is a lateral position of the sensor fusion track, $x^{cr}$ is the longitudinal position of the side radar and $y^{cr}$ is the lateral position of the side radar.

The fusion weights to the front and side radar track information may be set to generally trust the front radar track with respect to the longitudinal position of the sensor track and trust the side radar track with respect to the lateral position of the sensor track.

However, there is a field of view (FOV) boundary area in which performance of the sensors may be lowered, and thus residuals between the sensor track information, i.e., measured values, and estimated values may be designed as the fusion weights.

$w_x^r = |x^r - \hat{x}|, w_y^r = |y^r - \hat{y}|$ $w_x^{cr} = |x^{cr} - \hat{x}|, w_y^{cr} = |y^{cr} - \hat{y}|$ Here, $w_x^r$ and $w_y^r$ are the fusion weights to the front radar track information, $w_x^{cr}$ and $w_y^{cr}$ are the fusion weights to the side radar track information, x is the longitudinal position of the sensor fusion track, y is the lateral position of the sensor fusion track, $x^{cr}$ is the longitudinal position of the side radar, $y^{cr}$ is the lateral position of the side radar and $\hat{x}$ and $\hat{y}$ are estimated values.

In the above Equations, $\hat{x}$ and $\hat{y}$ may be estimated values acquired by an estimator using the calculated final track and x and y.

As such, whether or not the association between the sensor tracks exists may be determined based on the condition expressed by Equations $\{x^r : (x^{cr} - x^r)^2 \leq \sigma_x^2\}$, $\{y^r : (y^{cr} - y^r)^2 \leq \sigma_y^2\}$ ($x^r$ being a longitudinal position of a front radar, $y^r$ being a lateral position of the front radar, $x^{cr}$ being a longitudinal position of a side radar, $y^{cr}$ being a lateral position of the side radar, $\sigma_x$ being a longitudinal position error standard deviation of the sensor track and $\sigma_y$ being a lateral position error standard deviation of the sensor track), and the design variables expressed by Equations $\sigma_x \approx w$, $\sigma_y \approx l$ ($\sigma_x$ being the longitudinal position error standard deviation of the sensor track, $\sigma_y$ being the lateral position error standard deviation of the sensor track, w being a width of the target vehicle and l being a length of the target vehicle).

Further, whether or not the association between the sensor tracks exists may be determined based on an Equation $$f(x^{cr}, x^r, \sigma_x) = \frac{1}{\sqrt{2\pi\sigma_x^2}} \exp\left\{-\frac{(x^{cr} - x^r)^2}{2\sigma_x^2}\right\}$$

($x^{cr}$ being the longitudinal position of the side radar, $x^r$ being the longitudinal position of the front radar and $\sigma_x$ being the longitudinal position error standard deviation of the sensor track), so that the sensor tracks mutually satisfy a normal distribution.

Also, whether or not the tracking reference points of the sensor tracks are the same may be determined based on the first condition expressed by an Equation $(x^{cr} \pm w/2, y^{cr} + l) \in \mathcal{S}$ ($x^{cr}$ being the longitudinal position of the side radar, $y^{cr}$ being the lateral position of the side radar, w being the width of the target vehicle, l being the length of the target vehicle and $\mathcal{S}$ being a sensing area of the front radar), and the second condition expressed by Equations $\{x^r : (x^{cr} - x^r)^2 \leq (\sigma_x/2)^2\}$, $\{y^r : (y^{cr} - y^r)^2 \leq (\sigma_y/5)^2\}$ ($x^r$ being the longitudinal position of the front radar, $y^r$ being the lateral position of the front radar, $x^{cr}$ being the longitudinal position of the side radar, $y^{cr}$ being the lateral position of the side radar, $\sigma_x$ being the longitudinal position error standard deviation of the sensor track and $\sigma_y$ being the lateral position error standard deviation of the sensor track).

Here, the first condition is a condition to determine whether or not the entirety or a part of the target vehicle is included in the sensing area of the front radar, and the second condition is a condition to determine whether or not the front radar track and the side radar track are generated by the same tracking reference point.

Further, when the sensor fusion track acquired by fusing the sensor tracks is output, sensor fusion track information may be calculated using Equations $x=w_x^r \cdot x^r + w_x^{cr} \cdot x^{cr}$, $y=w_y^r \cdot y^r + w_y^{cr} \cdot y^{cr}$ ($w_x^r$ and $w_y^r$ being fusion weights to front radar track information, $w_x^{cr}$ and $w_y^{cr}$ being fusion weights to side radar track information, x being a longitudinal position of the sensor fusion track, y being a lateral position of the sensor fusion track, $x^{cr}$ being the longitudinal position of the side radar and $y^{cr}$ being the lateral position of the side radar).

Here, when the sensor fusion track acquired by fusing the sensor tracks is output, the fusion weights to the front radar track information may be set to trust the front radar track with respect to the longitudinal position of the sensor track, and the fusion weights to the side radar track information may be set to trust the side radar track with respect to the lateral position of the sensor track.

Further, when the sensor fusion track acquired by fusing the sensor tracks is output, sensor fusion track information may be calculated using Equations $w_x^r=|x^r-\hat{x}|$, $w_y^r=|y^r-\hat{y}|$, $w_x^{cr}=|w_x^{cr}-\hat{x}|$, $w_y^{cr}=|y^{cr}-\hat{y}|$ ($w_x^r$ and $w_y^r$ being the fusion weights to the front radar track information, $w_x^{cr}$ and $w_y^{cr}$ being the fusion weights to the side radar track information, x being the longitudinal position of the sensor fusion track, y being the lateral position of the sensor fusion track, $x^{cr}$ being the longitudinal position of the side radar, $y^{cr}$ being the lateral position of the side radar and $\hat{x}$ and $\hat{y}$ being estimated values).

Thereafter, upon determining that the association between the sensor tracks does not exist, objects from which the sensor tracks are generated may be regarded as different objects and individual tracking of the respective sensor tracks may be performed using the Kalman filter.

Figure 4:
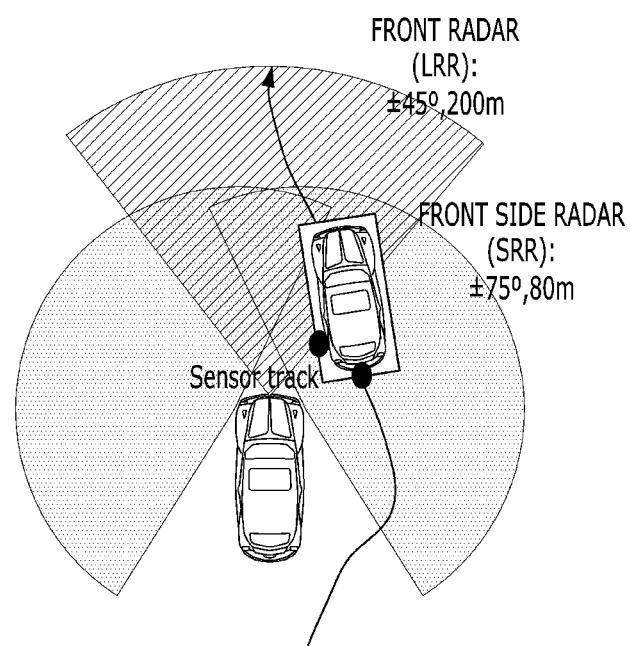
FIGS. 4 and 5 are views illustrating a method for tracking a target vehicle in accordance with embodiments of the present disclosure.
Figure 5:
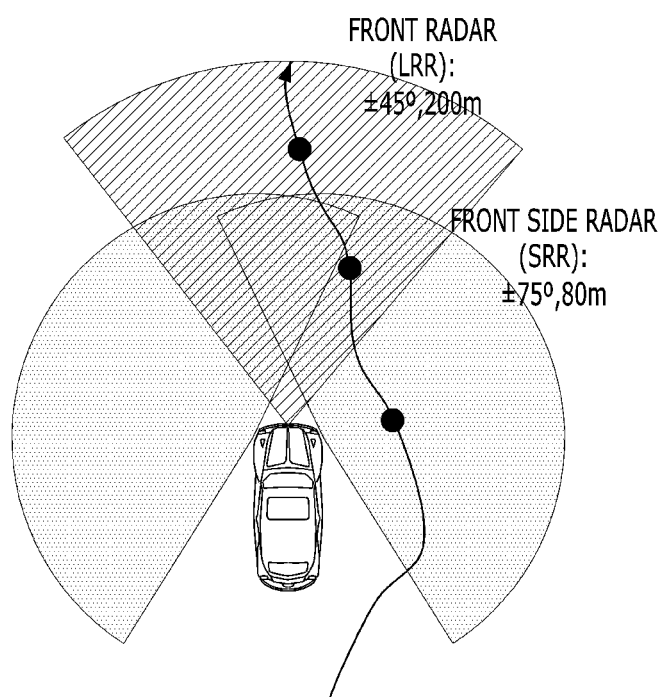

FIGS. 4 and 5 are views illustrating a method for tracking a target vehicle in accordance with embodiments of the present disclosure.

As exemplarily shown in FIGS. 4 and 5, the present disclosure may solve handover caused by use of a plurality of different kinds of sensors to realize an autonomous vehicle.

Since, if the same object simultaneously exists in a plurality of sensor recognition areas, a plurality of sensor tracks may be generated from a plurality of different kinds of sensors, whether or not the sensor tracks come from the same object should be correctly determined.

After determination as to whether or not the sensor tracks come from the same object, position and speed information of the target vehicle to be actually tracked should be expressed to coincide with actual behavior of the vehicle by fusing pieces of information of the sensor tracks.

In the present disclosure, a situation in which the target vehicle to be tracked is moved from a rear portion to a front portion in a lane next to a host vehicle and kinds and the number of sensors to sense the target vehicle are changed is considered.

Particularly, information of the target vehicle in individual areas or an overlapping area of a long range radar mounted at a front portion of the host vehicle and short range radars mounted at left and right side portions of the host vehicle may be consistently calculated.

If only a part of the target vehicle exists in the sensing area of the front radar, the front radar track may be generated by an adjacent reflective surface rather than the tracking reference point of the vehicle.

A rear area and a side area are areas recognized by the side radar alone, and a front area including a front side area is an area recognized by both front and side radars.

Since the mounting angles of sensors mounted in the vehicle correspond to information which may be known in advance, a position of an overlapping portion between recognition areas of the sensors may also be known in advance.

Embodiments of the present disclosure may solve handover by determining an association between respective sensor tracks in a corresponding area using the above-described information.

Particularly, the side radar employed to realize an autonomous vehicle may also provide width, length and heading angle information of a target, and may thus recognize a vehicle as an extended target rather than a point target.

Therefore, if a plurality of sensor tracks is generated in the corresponding area where handover may occur, whether or not information of the sensor tracks is fused on the assumption that the sensor tracks come from the same object or whether or not the sensor tracks are handled as tracks generated from different objects may be determined by determining whether or not the sensor tracks simultaneously exist within the range of the extended target.

A handover occurring area is set in consideration of recognition areas of sensors mounted in a vehicle.

Further, width and length information of a target vehicle is estimated while single tracking of the target vehicle by a side radar is performed, and heading angle information is continuously updated.

Also, an association between a plurality of sensor tracks generated in the handover occurring area is determined and, in this case, determination as to association/non-association between the sensor tracks is performed based on the width, length and heading angle information of the target vehicle. If only longitudinal positions of the radars are considered, an Equation below is used.

$$f(x^{cr}, x^r, \sigma_x) = \frac{1}{\sqrt{2\pi\sigma_x^2}} \exp\left\{-\frac{(x^{cr}-x^r)^2}{2\sigma_x^2}\right\}$$

Here, $x^{cr}$ is a longitudinal position of the side radar, $x^r$ is a longitudinal position of the front radar and $\sigma_x$ is a longitudinal position error standard deviation of the sensor track.

On the assumption that the longitudinal positions $x^{cr}$ and $x^r$ of the side and front radars come from the same object, the above Equation may be considered.

The standard deviation may be determined by the length and heading angle information supplied by the side radar.

Further, upon determining that the sensor tracks are generated from the same object, if it is determined that the sensor tracks are correctly calculated from the tracking reference point, pieces of information of the sensor tracks are fused into a single piece of information using Equations $x=w_x^r \cdot x^r + w_x^{cr} \cdot x^{cr}$, $y=w_y^r \cdot y^r + w_y^{cr} \cdot y^{cr}$ ($w_x^r$ and $w_y^r$ being fusion weights to front radar track information, $w_x^{cr}$ and $w_y^{cr}$ being fusion weights to side radar track information, x being a longitudinal position of a sensor fusion track, y being a lateral position of the sensor fusion track, $x^{cr}$ being the longitudinal position of the side radar and $y^{cr}$ being the lateral position of the side radar), and, upon determining that the association between the sensor tracks does not exist, the sensor tracks are regarded as being generated from different objects, and individual tracking of the respective sensor tracks is performed using the Kalman filter.

A method for tracking a target vehicle in accordance with embodiments of the present disclosure will be described below.

Sensor recognition information is received from a plurality of different kinds of sensors.

In receiving the sensor recognition information from the different kinds of sensors, the sensor recognition information may be received from the different kinds of sensors including a left-side radar, a right-side radar and a front radar.

Thereafter, sensor tracks are generated based on the received sensor recognition information.

Thereafter, whether or not the generated sensor tracks are present in plural is determined.

Next, whether or not an association between the sensor tracks exists is determined.

Determining whether or not the association between the sensor tracks exists may include setting tracking reference points of the sensor tracks with the same value as equal to each other prior to determining whether the association between the sensor tracks exists.

The tracking reference point may be calculated by Equations $x=x^{cr}+l/2\cdot\sin(\theta)$, $y=y^{cr}+l/2\cdot\cos(\theta)$ (x being a longitudinal position of the tracking reference point, y being a lateral position of the tracking reference point, $x^{cr}$ being a longitudinal position of the side radar, $y^{cr}$ being a lateral position of the side radar and l being a length of the target vehicle).

Further, determining whether or not the association between the sensor tracks exists may further include performing single tracking of the target vehicle using the Kalman filter the sensor tracks are located in a single sensing area of one sensor, prior to determining whether or not the association between the sensor tracks exists.

Upon determining that the association between the sensor tracks does not exist, the sensor tracks are regarded as being generated from different objects, and individual tracking of the respective sensor tracks is performed using the Kalman filter.

In contrast, upon determining that the association between the sensor tracks exists, whether or not tracking reference points of the sensor tracks are the same is determined.

Whether or not the association between the sensor tracks exists may be determined based on a condition expressed by Equations $\{x^r: (x^{cr}-x^r)^2 \leq \sigma_x^2\}$, $\{y^r: (y^{cr}-y^r)^2 \leq \sigma_y^2\}$ ($x^r$ being a longitudinal position of a front radar, $y^r$ being a lateral position of the front radar, $x^{cr}$ being the longitudinal position of the side radar, $y^{cr}$ being the lateral position of the side radar, $\sigma_x$ being a longitudinal position error standard deviation of the sensor track and $\sigma_y$ being a lateral position error standard deviation of the sensor track), and design variables expressed by Equations $\sigma_x \approx w$, $\sigma_y \approx l$ ($\sigma_x$ being the longitudinal position error standard deviation of the sensor track, $\sigma_y$ being the lateral position error standard deviation of the sensor track, w being a width of the target vehicle and l being a length of the target vehicle).

Further, whether or not the association between the sensor tracks exists is determined may be determined based on an Equation $$f(x^{cr}, x^r, \sigma_x) = \frac{1}{\sqrt{2\pi\sigma_x^2}} \exp\left\{-\frac{(x^{cr}-x^r)^2}{2\sigma_x^2}\right\}$$

($x^{cr}$ being the longitudinal position of the side radar, $x^r$ being the longitudinal position of the front radar and $\sigma_x$ being the longitudinal position error standard deviation of the sensor track), so that the sensor tracks mutually satisfy a normal distribution.

Whether or not the tracking reference points of the sensor tracks are the same may be determined based on a first condition expressed by an Equation $(x^{cr} \pm w/2, y^{cr}+l) \in \mathcal{S}$ ($x^{cr}$ being the longitudinal position of the side radar, $y^{cr}$ being the lateral position of the side radar, w being the width of the target vehicle, l being the length of the target vehicle and $\mathcal{S}$ being a sensing area of the front radar), and a second condition expressed by Equations $\{x^r: (x^{cr}-x^r)^2 \leq (\sigma_x/2)^2\}$, $\{y^r: (y^{cr}-y^r)^2 \leq (\sigma_y/5)^2\}$ ($x^r$ being the longitudinal position of the front radar, $y^r$ being the lateral position of the front radar, $x^{cr}$ being the longitudinal position of the side radar, $y^{cr}$ being the lateral position of the side radar, $\sigma_x$ being the longitudinal position error standard deviation of the sensor track and $\sigma_y$ being the lateral position error standard deviation of the sensor track).

Here, the first condition is a condition to determine whether or not the entirety or a part of the target vehicle is included in the sensing area of the front radar, and the second condition is a condition to determine whether or not the front radar track and the side radar track are generated by the same tracking reference point.

Hereafter, upon determining that the tracking reference points of the sensor tracks are the same, a sensor fusion track acquired by fusing the sensor tracks is output.

Here, in outputting the sensor fusion track acquired by fusing the sensor tracks, sensor fusion track information may be calculated using Equations $x=w_x^r \cdot x^r + w_x^{cr} \cdot x^{cr}$, $y=w_y^r \cdot y^r + w_y^{cr} \cdot y^{cr}$ ($w_x^r$ and $w_y^r$ being fusion weights to front radar track information, $w_x^{cr}$ and $w_y^{cr}$ being fusion weights to side radar track information, x being a longitudinal position of the sensor fusion track, y being a lateral position of the sensor fusion track, $x^{cr}$ being the longitudinal position of the side radar and $y^{cr}$ being the lateral position of the side radar).

In outputting the sensor fusion track acquired by fusing the sensor tracks, fusion weights to the front radar track information may be set to trust the front radar track with respect to the longitudinal position of the sensor track, and fusion weights to the side radar track information may be set to trust the side radar track with respect to the lateral position of the sensor track.

Further, in outputting the sensor fusion track acquired by fusing the sensor tracks, the sensor fusion track information may be calculated using Equations $w_x^r=|x^r-\hat{x}|$, $w_y^r=|y^r-\hat{y}|$, $w_x^{cr}=|x^{cr}-\hat{x}|$, $w_y^{cr}=|y^{cr}-\hat{y}|$ ($w_x^r$ and $w_y^r$ being the fusion weights to the front radar track information, $w_x^{cr}$ and $w_y^{cr}$ being the fusion weights to the side radar track information, x being the longitudinal position of the sensor fusion track, y being the lateral position of the sensor fusion track, $x^{cr}$ being the longitudinal position of the side radar, $y^{cr}$ being the lateral position of the side radar and $\hat{x}$ and $\hat{y}$ being estimated values).

Thereafter, the output sensor fusion track is tracked.

Thereafter, the tracked sensor fusion track is managed.

Further, a process provided by a method for tracking a target vehicle using an apparatus for tracking a target vehicle in accordance with embodiments of the present disclosure may be executed by a computer readable recording medium in which a program for executing the target vehicle tracking method in accordance with one embodiment of the present disclosure is recorded.

A vehicle in accordance with embodiments of the present disclosure may include a sensing apparatus configured to sense peripheral vehicles and an apparatus for tracking a target vehicle configured to output a sensor fusion track based on a plurality of pieces of sensor recognition information received from the sensing apparatus, and the target vehicle tracking apparatus may include a sensor track processing unit configured to receive sensor recognition information from a plurality of different kinds of sensors and to generate sensor tracks, a sensor track association determination unit configured to determine whether or not an association between the sensor tracks exists when the sensor tracks are present in plural, to determine whether or not tracking reference points of the sensor tracks are the same upon determining that the association between the sensor tracks exists, and to output a sensor fusion track acquired by fusing the sensor tracks upon determining that the tracking reference points of the sensor tracks are the same, a sensor fusion track tracking unit configured to track the output sensor fusion track, and a sensor fusion track management unit configured to manage the tracked sensor fusion track.

As such, embodiments of the present disclosure may determine whether or not an association between a plurality of sensor tracks exists, determine whether or not tracking reference points of the sensor tracks are the same and generate a sensor fusion track based on results of determination, thereby accurately determining whether or not the sensor tracks come from the same object and thus precisely tracking the target vehicle.

Further, embodiments of the present disclosure may solve handover caused by use of a plurality of different kinds of sensors to realize an autonomous vehicle.

In addition, embodiments of the present disclosure may calculate position information of a vehicle driving straight in the longitudinal direction in a lane next to a host vehicle so as to coincide with actual vehicle behavior.

Further, embodiments of the present disclosure proposes a method for properly fusing position information of respective sensor tracks beyond determination as to whether or not the sensor tracks correspond to the same object, and may thus facilitate precise control required to realize an autonomous vehicle.

Therefore, embodiments of the present disclosure may be applied to a target vehicle tracking technique using a plurality of different kinds of sensors.

The above-described method in accordance with embodiments of the present disclosure may be implemented as computer readable code in a computer readable recording medium in which a program is recorded. Computer readable recording media include all kinds of recording devices in which data readable by computer systems is stored. For example, the computer readable recording media may include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

As is apparent from the above description, in an apparatus for tracking a target vehicle, a method for tracking a target vehicle using the same and a vehicle including the same in accordance with embodiments of the present disclosure, whether or not an association between a plurality of sensor tracks exists is determined, whether or not tracking reference points of the sensor tracks are the same is determined and a sensor fusion track is generated based on results of determination, thereby accurately determining whether or not the sensor tracks come from the same object and thus precisely tracking the target vehicle.

Further, embodiments of the present disclosure may solve handover caused by use of a plurality of different kinds of sensors to realize an autonomous vehicle.

In addition, embodiments of the present disclosure may calculate position information of a vehicle driving straight in the longitudinal direction in a lane next to a host vehicle so as to coincide with actual vehicle behavior.

Further, embodiments of the present disclosure proposes a method for properly fusing position information of the respective sensor tracks beyond determination as to whether or not the sensor tracks correspond to the same object, and may thus facilitate precise control required to realize an autonomous vehicle.

Therefore, embodiments of the present disclosure may be applied to a target vehicle tracking technique using a plurality of different kinds of sensors.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. An apparatus for tracking a target vehicle, comprising:
    a sensor track processor configured to receive sensor recognition information from different kinds of sensors operatively coupled to the vehicle and generates sensor tracks based on the sensor recognition information;
    a sensor track association determination processor configured to determine whether an association between the individual sensor tracks exists, determine whether tracking reference points of the sensor tracks are the same when the association between the individual sensor tracks exists, generate a sensor fusion track by fusing the sensor tracks when the tracking reference points of the sensor tracks are the same, and outputs the sensor fusion track;
    a sensor fusion track tracking processor configured to track the outputted sensor fusion track; and
    a sensor fusion track management processor configured to manage the tracked sensor fusion track.

2. The apparatus according to claim 1, wherein the sensor track processor receives the sensor recognition information from a left-side radar of the vehicle, a right-side radar of the vehicle, and a front radar of the vehicle.

3. The apparatus according to claim 1, wherein the sensor track association determination processor sets tracking reference points of the sensor tracks with the same value as equal to each other before determining whether the association between the individual sensor tracks exists.

4. The apparatus according to claim 1, wherein the sensor track association determination processor performs single tracking of the target vehicle using a Kalman filter when the sensor tracks are located in a single sensing area of one sensor among the different kinds of sensors before determining whether the association between the sensor tracks exists.

5. The apparatus according to claim 4, wherein the sensor track association determination processor estimates width and length information of the target vehicle when using the Kalman filter to perform the single tracking of the target vehicle.

6. The apparatus according to claim 5, wherein the sensor track association determination processor confirms coincidence between class information of the sensor track and the width and length information corresponding thereto when estimating the width and length information of the target vehicle.

7. The apparatus according to claim 1, wherein the sensor track association determination processor determines whether the association between the individual sensor tracks exists based on:
   (1) a condition expressed by Equations $\{x^r:(x^{cr}-x^r)^2 \leq \sigma x^2\}$, $\{y^r:(y^{cr}-y^r)^2 \leq \sigma y^2\}$, $x^r$ being a longitudinal position of a front radar of the vehicle, $y^r$ being a lateral position of the front radar, $x^{cr}$ being a longitudinal position of a side radar of the vehicle, $y^{cr}$ being a lateral position of the side radar, $\sigma x$ being a longitudinal position error standard deviation of the sensor track, and $\sigma y$ being a lateral position error standard deviation of the sensor track, and
   (2) design variables expressed by Equations $\sigma x \approx w$, $\sigma y \approx l$, $\sigma x$ being the longitudinal position error standard deviation of the sensor track, $\sigma y$ being the lateral position error standard deviation of the sensor track, w being a width of the target vehicle, and l being a length of the target vehicle.

8. The apparatus according to claim 1, wherein the sensor track association determination processor determines whether the tracking reference points of the sensor tracks are the same based on:
   (1) a first condition expressed by an Equation $(x^{cr} \pm w/2, y^{cr}+l) \in \mathcal{S}$, $x^{cr}$ being a longitudinal position of a side radar of the vehicle, $y^{cr}$ being a lateral position of the side radar, w being a width of the target vehicle, l being a length of the target vehicle, and $\mathcal{S}$ being a sensing area of a front radar of the vehicle, and
   (2) a second condition expressed by Equations $\{x^r:(x^{cr}-x^r)^2 \leq (\sigma x/2)^2\}$, $\{y^r: (y^{cr}-y^r)^2 \leq (\sigma y/5)^2\}$, $x^r$ being a longitudinal position of a front radar of the vehicle, $y^r$ being a lateral position of the front radar, $x^{cr}$ being the longitudinal position of the side radar, $y^{cr}$ being the lateral position of the side radar, $\sigma x$ being a longitudinal position error standard deviation of the sensor track, and $\sigma y$ being a lateral position error standard deviation of the sensor track.

9. The apparatus according to claim 1, wherein, when generating the sensor fusion track, the sensor track association determination processor calculates sensor fusion track information using Equations $x = w_x^r \cdot x^r + w_x^{cr} \cdot x^{cr}$, $y = w_y^r \cdot y^r + w_y^{cr} \cdot y^{cr}$,
   wherein $w_x^r$ and $w_y^r$ are fusion weights to front radar track information, $w_x^{cr}$ and $w_y^{cr}$ are fusion weights to side radar track information, x is a longitudinal position of the sensor fusion track, y is a lateral position of the sensor fusion track, $x^{cr}$ is a longitudinal position of a side radar, and $y^{cr}$ is a lateral position of the side radar.

10. The apparatus according to claim 1, wherein the sensor track association determination processor performs individual tracking of the respective sensor tracks using a Kalman filter when the association between the individual sensor tracks does not exist.

11. A method for tracking a target vehicle, comprising:
   receiving, at a sensor track processor, sensor recognition information from different kinds of sensors operatively coupled to the vehicle;
   generating, by the sensor track processor, sensor tracks based on the received sensor recognition information;
   determining, at a sensor track association determination processor, whether an association between the individual sensor tracks exists;
   determining, at the sensor track association determination processor, whether tracking reference points of the sensor tracks are the same when the association between the individual sensor tracks exists;
   generating, at the sensor track association determination processor, a sensor fusion track by fusing the sensor tracks when the tracking reference points of the sensor tracks are the same;
   outputting, at the sensor track association determination processor, the sensor fusion track;
   tracking, at a sensor fusion track tracking processor, the outputted sensor fusion track; and
   managing, at a sensor fusion track management processor, the tracked sensor fusion track.

12. The method according to claim 11, wherein the receiving of the sensor recognition information comprises receiving, at the sensor track processor, the sensor recognition information from a left-side radar of the vehicle, a right-side radar of the vehicle, and a front radar of the vehicle.

13. The method according to claim 11, wherein the determining of whether the association between the individual sensor tracks exists comprises setting, by the sensor track association determination processor, tracking reference points of the sensor tracks with the same value as equal to each other before determining whether the association between the individual sensor tracks exists.

14. The method according to claim 11, wherein the determining of whether the association between the individual sensor tracks exists comprises performing, by the sensor track association determination processor, single tracking of the target vehicle using a Kalman filter when the sensor tracks are located in a single sensing area of one sensor among the different kinds of sensors before determining whether the association between the sensor tracks exists.

15. The method according to claim 14, wherein the performing of the single tracking of the target vehicle comprises estimating, by the sensor track association determination processor, width and length information of the target vehicle.

16. The method according to claim 15, wherein the estimating of the width and length information of the target vehicle comprises confirming, by the sensor track association determination processor, coincidence between class information of the sensor track and the width and length information corresponding thereto is confirmed.

17. The method according to claim 11, wherein the determination of whether the association between the individual sensor tracks is performed based on:
   (1) a condition expressed by Equations $\{x^r:(x^{cr}-x^r)^2 \leq \sigma x^2\}$, $\{y^r:(y^{cr}-y^r)^2 \leq \sigma y^2\}$, $x^r$ being a longitudinal position of a front radar of the vehicle, $y^r$ being a lateral position of the front radar, $x^{cr}$ being a longitudinal position of a side radar of the vehicle, $y^{cr}$ being a lateral position of the side radar, $\sigma x$ being a longitudinal position error standard deviation of the sensor track, and $\sigma y$ being a lateral position error standard deviation of the sensor track, and
   (2) design variables expressed by Equations $\sigma x \approx w$, $\sigma y \approx l$, $\sigma x$ being the longitudinal position error standard deviation of the sensor track, $\sigma y$ being the lateral position error standard deviation of the sensor track, w being a width of the target vehicle, and l being a length of the target vehicle.

18. The method according to claim 11, wherein the determination of whether the tracking reference points of the sensor tracks are the same is performed based on:
   (1) a first condition expressed by an Equation $(x^{cr} \pm w/2, y^{cr}+l) \in \mathcal{S}$, $x^{cr}$ being a longitudinal position of a side radar of the vehicle, $y^{cr}$ being the lateral position of the side radar, w being a width of the target vehicle, l being a length of the target vehicle, and $\mathcal{S}$ being a sensing area of a front radar of the vehicle, and (2) a second condition expressed by Equations $\{x^r:(x^{cr}-x^r)^2 \leq (\sigma x/2)^2\}$, $\{y^r:(y^{cr}-y^r)^2 \leq (\sigma y/5)^2\}$, $x^r$ being a longitudinal position of a front radar, $y^r$ being a lateral position of the front radar, $x^{cr}$ being the longitudinal position of the side radar, $y^{cr}$ being the lateral position of the side radar, $\sigma x$ being a longitudinal position error standard deviation of the sensor track, and $\sigma y$ being a lateral position error standard deviation of the sensor track.

19. The method according to claim 11, wherein the generating of the sensor fusion track comprises calculating, by the sensor fusion track tracking processor, sensor fusion track information using Equations $x = w_x^r \cdot x^r + w_x^{cr} \cdot x^{cr}$, $y = w_y^r \cdot y^r + w_y^{cr} \cdot y^{cr}$, wherein $w_x^r$ and $w_y^r$ are fusion weights to front radar track information, $w_x^{cr}$ and $w_y^{cr}$ are fusion weights to side radar track information, x is a longitudinal position of the sensor fusion track, y is a lateral position of the sensor fusion track, $x^{cr}$ is a longitudinal position of a side radar of the vehicle, and $y^{cr}$ is a lateral position of the side radar.

20. The method according to claim 11, wherein further comprising performing, by the sensor track association determination processor, individual tracking of the respective sensor tracks using a Kalman filter is performed when the association between the individual sensor tracks does not exist.

* * * * *